(12) United States Patent
Han

(10) Patent No.: US 7,218,512 B2
(45) Date of Patent: May 15, 2007

(54) MOUNTING APPARATUS FOR STORAGE DEVICES

(75) Inventor: Shao-Bo Han, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 249 days.

(21) Appl. No.: 10/973,506

(22) Filed: Oct. 26, 2004

(65) Prior Publication Data

US 2005/0117289 A1 Jun. 2, 2005

(30) Foreign Application Priority Data

Nov. 29, 2003 (CN) .................. 2003 2 0118843

(51) Int. Cl.
*G06F 1/16* (2006.01)
(52) U.S. Cl. ................ 361/685; 312/223.1; 312/223.2; 248/222.11
(58) Field of Classification Search ................ 361/685
See application file for complete search history.

(56) References Cited

U.S. PATENT DOCUMENTS

| 5,423,605 | A | * | 6/1995 | Liu | .......................... | 312/265.6 |
| 6,234,593 | B1 | * | 5/2001 | Chen et al. | .............. | 312/223.2 |
| 6,373,694 | B1 | | 4/2002 | Chang | | |
| 6,738,255 | B2 | * | 5/2004 | Chen | .......................... | 361/683 |
| 6,853,549 | B2 | * | 2/2005 | Xu | .............................. | 361/685 |
| 2003/0058612 | A1 | * | 3/2003 | Liu et al. | .................... | 361/685 |
| 2003/0090869 | A1 | * | 5/2003 | Liu et al. | .................... | 361/685 |

* cited by examiner

*Primary Examiner*—Anatoly Vortman
*Assistant Examiner*—Anthony Q. Edwards
(74) *Attorney, Agent, or Firm*—Morris Manning & Martin LLP; Tim Tingkang Xia, Esq.

(57) ABSTRACT

A mounting apparatus for a storage device (40) include a storage bracket (20) and a fixing plate (60). The storage bracket has a side panel (23a) defining at least one groove (24) for slidingly receiving the storage device. The fixing plate is attached to the side panel of the storage bracket. The fixing plate has at least one resilient latch (63) corresponding to the groove for securing the storage device. At least one ear (635) is formed on the latch. The ear abuts against the fixing plate before said latch is deformed excessively for releasing the storage device.

19 Claims, 4 Drawing Sheets

MOUNTING APPARATUS FOR STORAGE DEVICES

BACKGROUND OF THE INVENTION

1. Field of the Invention

The present invention relates to mounting apparatuses, and particularly to mounting apparatuses that readily attach data storage devices in brackets of a computer enclosure.

2. Description of the Related Art

Various data storage devices are installed in computers for communication and handling of data. Such devices include, for example, hard disk drives, floppy disk drives, and CD-ROM drives.

A conventional data storage device is directly attached to a computer enclosure with bolts. However, attachment with bolts is unduly complicated and time-consuming.

In U.S. Pat. No. 6,373,694, a fastening device is disclosed to mount a data storage device to a computer enclosure. The fastening device is configured on a frame to have a plurality of pairs of opposed grooves, a block member on one side of the frame with grooves disposed thereon, and a plurality of latched members disposed on the block member each corresponding to the groove. In fastening a hard disk to the frame, the hard disk is inserted into the frame with projections of the hard disk sliding along grooves until one projection contacts the latched member to be secured therein. In detaching the secured a hard disk, push an engagement section of the latched member to release the projection of the hard disk prior to removing the hard disk from the frame. However, the structure of the fastening device is obviously complex.

In US Patent Pub. No. 20030058612, another fixing apparatus is disclosed to mount a data storage device to a computer enclosure. The fixing apparatus includes a drive bracket and a fixing plate. The drive bracket includes a side panel defining grooves for slidingly receiving screws that are attached on opposite sides of the storage devices. The fixing plate is attached on the side panel, and includes locking elements. Each locking element includes a spring portion, a stop wall, and a handle. To mount a storage device to the bracket, the screws are slid along opposite grooves. One screw outward presses a spring portion, and causes it to be elastically deformed. When that screw has slid beyond the spring portion, the spring portion elastically returns to its original position. The stop wall and the side panel sandwich that screw therebetween. However, the handle is easy to be broken off when it is pulled outwardly to remove the storage device. Especially, the handle is often made of plastic material.

SUMMARY OF THE INVENTION

Accordingly, an object of the present invention is to provide a reliable mounting apparatus which readily attach storage devices in a storage bracket.

To achieve the above objects, a mounting apparatus in accordance with the present invention comprises a storage bracket and a fixing plate. The storage bracket has a side panel defining at least one groove for slidingly mounting the storage device. The fixing plate is attached to the side panel of the storage bracket. The fixing plate has at least one resilient latch corresponding to the groove for securing the storage device. At least one ear is formed on the latch. The ear abuts against the fixing plate before said latch is deformed excessively for releasing the storage device.

Other objects, advantages and novel features of the present invention will be drawn from the following detailed description of a preferred embodiment of the present invention with the attached drawings, in which:

DETAILED DESCRIPTION OF THE PRESENT INVENTION

Figure 1:
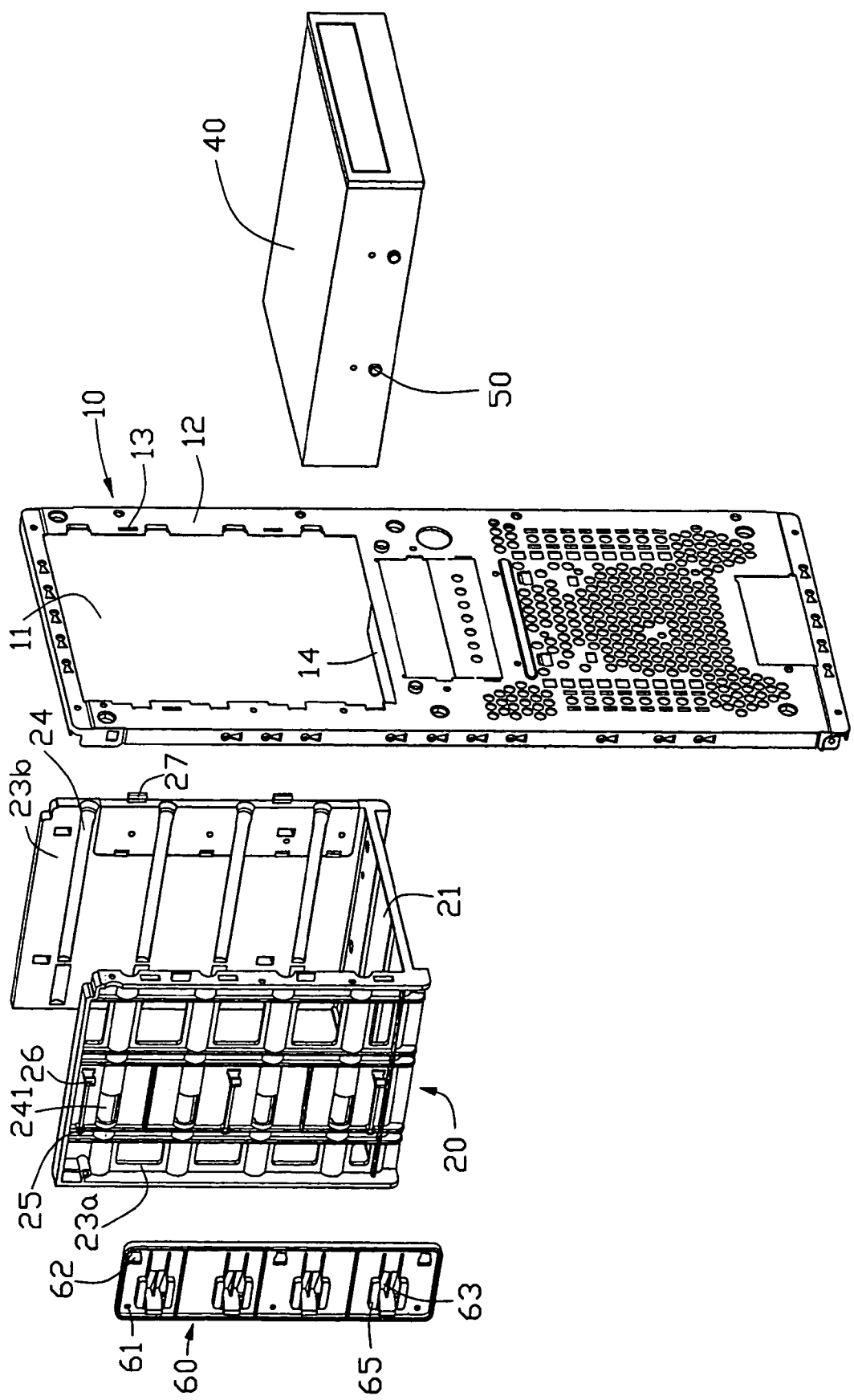
FIG. 1 is an exploded, isometric view of a mounting apparatus in accordance with a preferred embodiment of the present invention, the mounting apparatus comprising a storage bracket and a fixing plate.
Figure 4:
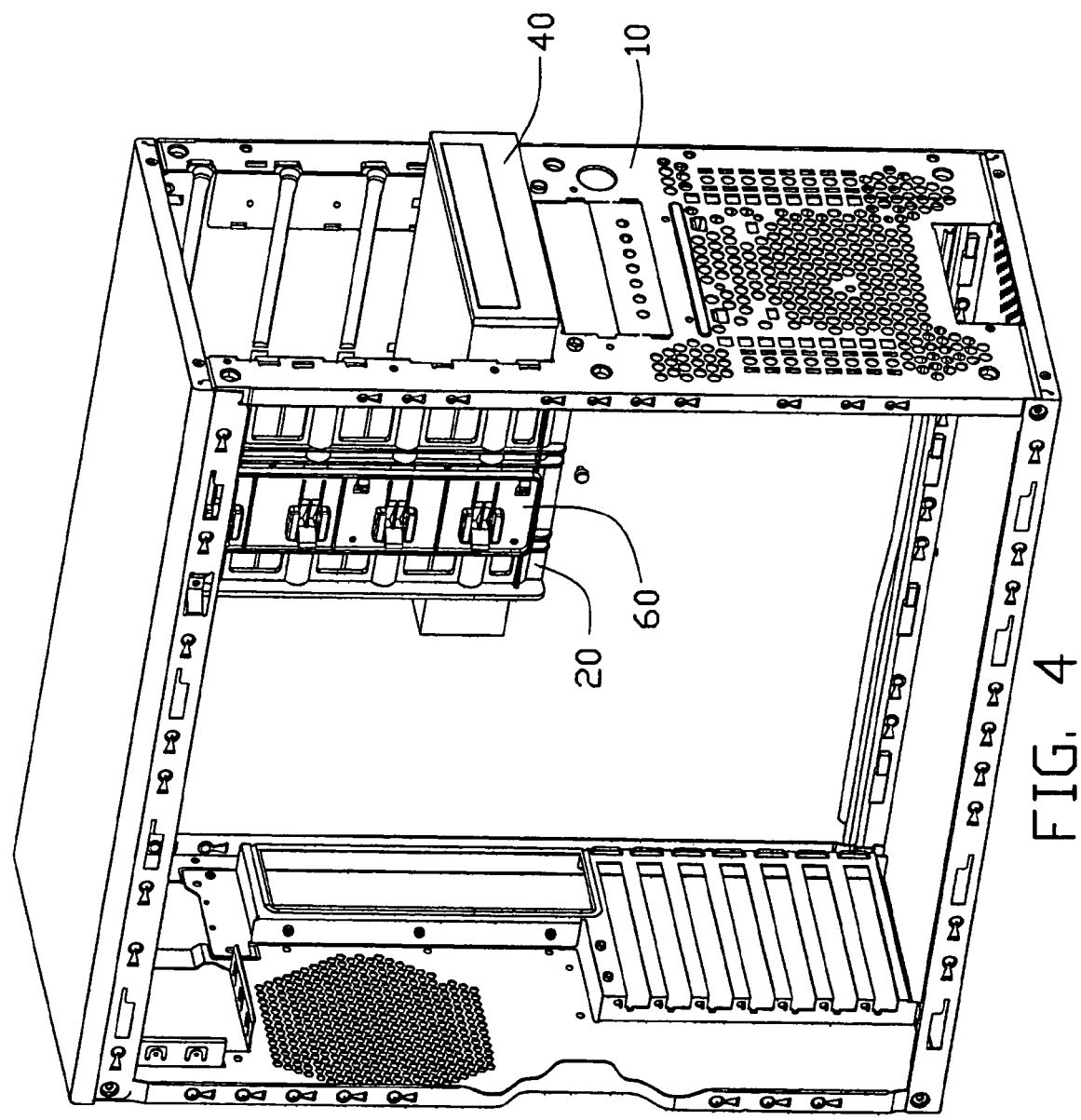
FIG. 4 is an assembled view showing the mounting apparatus mounting a storage device in a computer.

Referring to FIGS. 1 and 4, a mounting apparatus in accordance with the preferred embodiment of the present invention is provided for holding a storage device 40 in place. The storage device has a plurality of screws 50 attached to two sides thereof. The mounting apparatus comprises a fixing plate 60 and a storage bracket 20 attached to a front plate 10 of a computer enclosure.

The front plate 10 defines an opening 11 corresponding to the storage bracket 20, thereby the storage device being inserted through the opening 11 into the storage bracket 20. A plurality of slits 13 is defined at two sides 12 of the opening 11. A rack 14 is bent inward at the bottom edge of the opening 11 for supporting the storage bracket 10.

The U-shaped storage bracket 20 comprises a bottom panel 21 and a pair of side panels 23a, 23b. The side panels 23a, 23b have flanges. Corresponding to the slits 13 on the front plate 10, a plurality of barbs 27 is formed on the front flange of the side panels 23a, 23b, thereby attaching the storage bracket 20 to the front plate 10. A plurality of opposite grooves 24 is parallel defined in the side panels 23a, 23b, for guiding the data storage device 40 into the drive bracket 20. A cutout 241 is defined at an end of each groove 24 in the side panel 23a. Three locating posts 25 and three hooks 26 are formed on the side panel 23a for securing the fixing plate 60 thereon.

Figure 2:
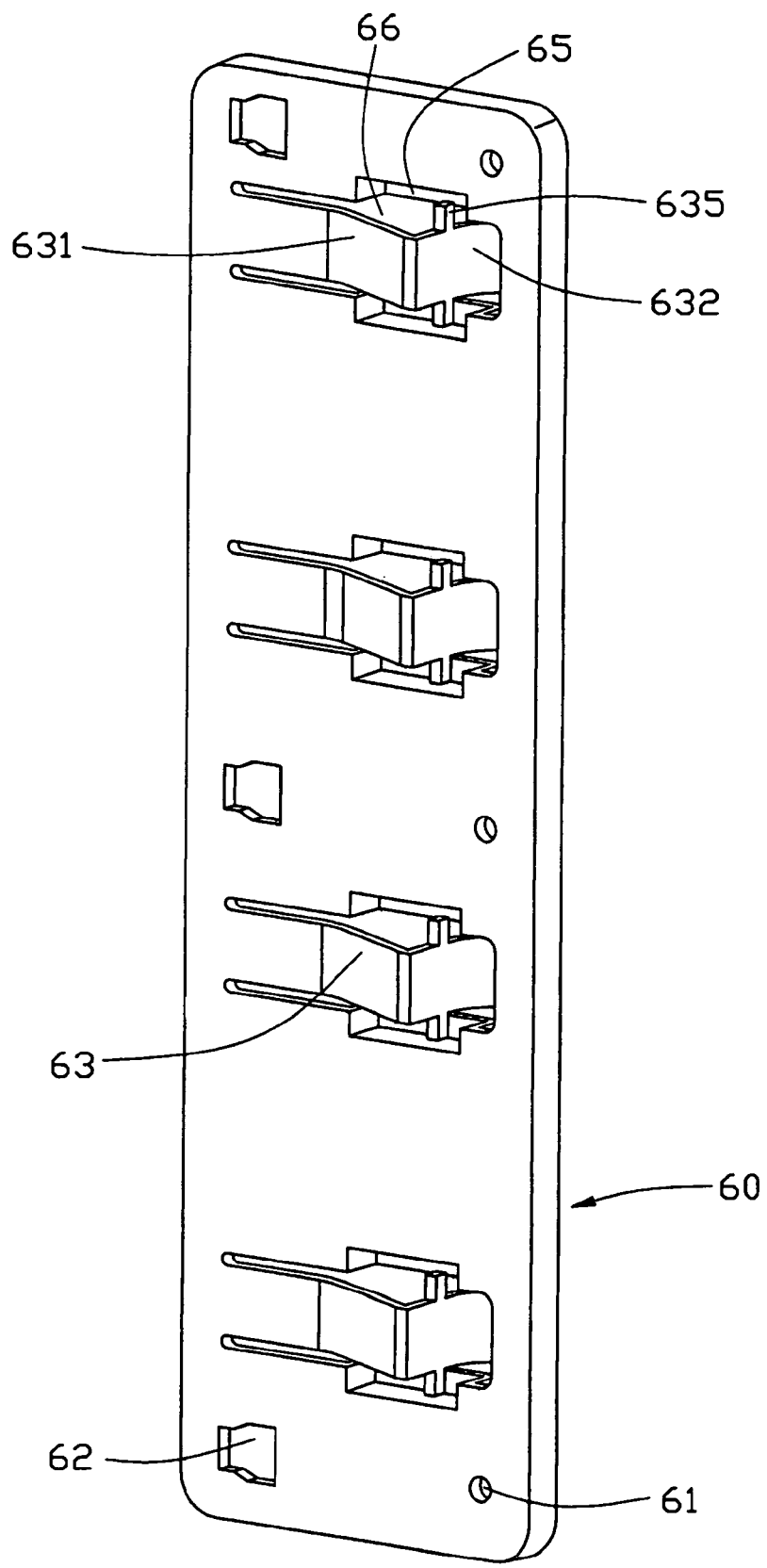
FIG. 2 is an isometric view of the fixing plate of FIG. 1.

Referring also to FIG. 2, the fixing plate 60 is rectangular. The fixing plate 60 is strengthened with a plurality of ridges formed thereon. Corresponding to the locating posts 25 and hooks 26 on the drive bracket 20, three locating holes 61 and three apertures 62 are defined in the fixing plate 60. Corresponding to each cutout 241, a resilient latch 63 is formed on the fixing plate 60. Each latch 63 is formed within a rectangular opening 66 on the fixing plate 60. A pair of recessions 65 is defined at upper and bottom edges of the opening 66. The latch 63 has a leading portion 631 and a handle portion 632. The leading portion 631 extends rearwardly from a front edge of the opening 66 first and then inwardly toward the bracket 20. The handle portion 632 extends outwardly from the extending end of the leading portion 631. Corresponding to the recessions 65, a pair of opposite ears 635 is formed on the handle portion 632 adjacent to the junction of the leading portion 631 and the handle portion 632 to form a protective mechanism with the recessions 65. When the handle portion 632 is pulled outwardly and apparently reach a bearable deformation limit thereof, the ears 635 abut against the recessions 65, thereby to prevent the latch 63 being deformed excessively.

Figure 3:
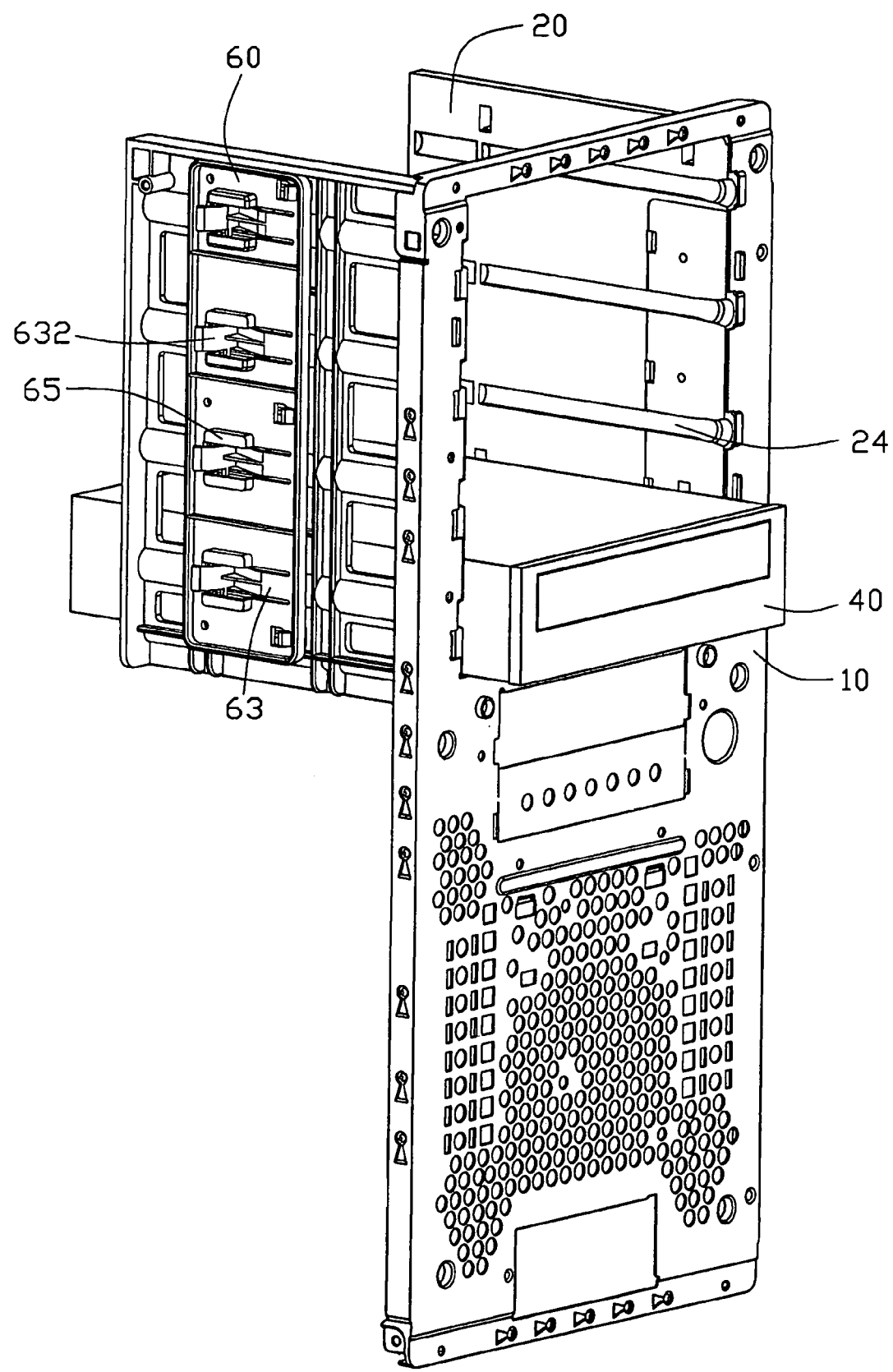
FIG. 3 is an assembled view of FIG. 1.

Referring also to FIG. 3, in assembly, the fixing plate 60 is attached to the storage bracket 20 initially, with the locating posts 25 engaging in the locating holes 61 and the hooks 26 engaging with the apertures 62. The junction of the leading portion 631 and the handle portion 632 of the latch 63 extends into the cutout 241 of the storage bracket 20. Then, the storage bracket 20 is attached to the front plate 10, with the barbs 27 engaging with the slits 13.

The storage device 40 is inserted into the storage bracket 20 via the opening 11, with the screws 50 of the storage device 40 sliding along the grooves 24 of the storage bracket 20. The screw 50 outwardly presses the leading portion 631 and causes the leading portion 631 to be deformed. The screw 50 slides over the junction of the leading portion 631 and the handle portion 632. Then the leading portion 631 elastically returns to its original position. The screw 50 is stopped by the latch 63 so that the storage device 40 can not be withdrawn at this moment.

In removing the storage device 40, the handle portion 632 of the latch 63 is pulled outwardly. The screw 50 is released from the latch 63. Due to the ears 635 and the recessions 65, the latch 63 can not be deformed excessively. The storage device 40 is then readily slid out from the storage bracket 20.

While the present invention has been illustrated by the description of the preferred embodiment thereof, and while the preferred embodiment has been described in considerable detail, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative examples shown and described.

What is claimed is:

1. A mounting apparatus for a storage device, comprising:
   a storage bracket having a side panel defining at least one groove for slidingly receiving screws mounted on the storage device therein;
   a fixing plate attached to the side panel of the storage bracket, the fixing plate having at least one resilient latch corresponding to said groove for securing the storage device, at least one ear being formed on the latch, at least one recession defined in the fixing plate beside the resilient latch for abutting against said ear before said latch is deformed excessively for releasing the storage device.

2. The mounting apparatus as claimed in claim 1, wherein said latch comprises a leading portion and a handle portion, the leading portion extends rearwardly and inwardly, the handle portion extends outwardly from a free end of the leading portion.

3. The mounting apparatus as claimed in claim 2, wherein said ear is formed on the handle portion, and adjacent to the junction of the leading portion and the handle portion.

4. The mounting apparatus as claimed in claim 1, wherein said latch is formed within an opening, said recession is defined in the fixing plate along the edge of the opening.

5. The mounting apparatus as claimed in claim 1, wherein at least one locating post is formed on the side panel of the storage bracket, and at least one locating hole is defined in the fixing plate corresponding to said locating post, thereby attaching the fixing plate to the storage bracket.

6. The mounting apparatus as claimed in claim 5, wherein at least one hook is formed on the side panel of the storage bracket, and at least one aperture is defined in the fixing plate corresponding to said hook.

7. A computer, comprising:
   a storage device comprising screws attached thereon;
   a computer enclosure having a front plate;
   a storage bracket attached to the front plate, the storage bracket having a side panel defining at least one groove for slidingly receiving the screws of the storage device;
   a fixing plate attached to the side panel of the storage bracket, the fixing plate having at least one resilient latch corresponding to said groove for securing the storage device, at least one ear being formed on the latch, at least one recession defined in the fixing plate beside the resilient latch for abutting against said ear before said latch is deformed excessively for releasing the storage device.

8. The computer as claimed in claim 7, wherein said latch comprises a leading portion and a handle portion, the leading portion extends rearwardly and inwardly, the handle portion extends outwardly from a free end of the leading portion.

9. The computer as claimed in claim 8, wherein said ear is formed on the handle portion, and adjacent to the junction of the leading portion and the handle portion.

10. The computer as claimed in claim 7, wherein said latch is formed within an opening, said recession is defined in the fixing plate along the edge of the opening.

11. The computer as claimed in claim 7, wherein at least one locating post is formed on the side panel of the storage bracket, and at least one locating hole is defined in the fixing plate corresponding to said locating post, thereby attaching the fixing plate to the storage bracket.

12. The computer as claimed in claim 11, wherein at least one hook is formed on the side panel of the storage bracket, and at least one aperture is defined in the fixing plate corresponding to said hook.

13. The computer as claimed in claim 7, wherein at least one barb is formed on the storage bracket, and at least one slit is defined in the front plate correspondingly, thereby attaching the storage bracket to the front plate.

14. The computer as claimed in claim 7, wherein the front plate defines an opening therein for the storage device entering therethrough, a rack is bent inward at a bottom edge of the opening for supporting the storage bracket.

15. A mounting apparatus for a storage device of a computer, comprising:
   at least one groove defined in a storage bracket of said computer for slidably receiving screws attached to said storage device therein;
   a fixing plate attached to said storage bracket and having at least one resilient latch corresponding to said at least one groove, said at least one resilient latch movable between a first position where said at least one resilient latch non-resiliently intrudes in said at least one groove to form an close area in said at least one groove for securely receiving a part of said storage device, and a second position where said at least one resilient latch is forced to move resiliently and entirely out of said at least one groove by said part of said storage device; and
   a protective mechanism attachably formed on said fixing plate to restrain resilient movement of said at least one resilient latch in a predetermined range, the protective mechanism comprising an ear formed on said at least one resilient latch, and a recession formed on said fixing plate for receiving said ear to move therein in said predetermined range.

16. The mounting apparatus as claimed in claim 15, wherein said at least one resilient latch moves from said first position to said second position along a direction perpendicular to said at least one groove.

17. The mounting apparatus as claimed in claim 15, wherein said latch comprises a leading portion and a handle portion, the leading portion extends rearwardly and inwardly, the handle portion extends outwardly from a free end of the leading portion.

18. The mounting apparatus as claimed in claim 17, wherein said ear is formed on the handle portion, and adjacent to the junction of the leading portion and the handle portion.

19. The mounting apparatus as claimed in claim 15, wherein at least one locating post is formed on said storage bracket, and at least one locating hole is defined in said fixing plate corresponding to said at least one locating post, thereby attaching said fixing plate to said storage bracket.

\* \* \* \* \*